United States Patent
Hooper et al.

(10) Patent No.: US 10,436,241 B2
(45) Date of Patent: Oct. 8, 2019

(54) REINFORCED SNAP-HOOK WITH DUAL-DIRECTION SPRING LATCH

(71) Applicant: United States Government, San Diego, CA (US)

(72) Inventors: Ralph David Hooper, Lemon Grove, CA (US); William A. Chambers, Jamul, CA (US); James Benjamin Penney, Carlsbad, CA (US)

(73) Assignee: United States Government as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 15/906,678

(22) Filed: Feb. 27, 2018

(65) Prior Publication Data

US 2019/0264729 A1     Aug. 29, 2019

(51) Int. Cl.
*F16B 45/02* (2006.01)

(52) U.S. Cl.
CPC .................................. *F16B 45/025* (2013.01)

(58) Field of Classification Search
CPC ...................................................... F16B 45/025
See application file for complete search history.

(56) References Cited

U.S. PATENT DOCUMENTS

| | | | |
|---|---|---|---|
| 1,576,352 A * | 3/1926 | Nordling | F16B 45/02 24/599.8 |
| 4,595,223 A | 6/1986 | Howie | |
| 4,751,892 A * | 6/1988 | Sechel | B63B 21/00 114/221 R |
| 4,932,700 A | 6/1990 | Hart | |
| 5,538,303 A | 7/1996 | Dunham | |
| 5,899,512 A * | 5/1999 | Wiklund | B66C 1/36 24/599.3 |
| 5,927,431 A * | 7/1999 | Klein, Jr. | A62B 1/18 182/3 |
| 6,450,558 B1 | 9/2002 | Ringrose | |
| 7,810,442 B2 | 10/2010 | Duarte et al. | |
| 8,015,676 B1 * | 9/2011 | Choate | F16B 45/02 24/599.5 |
| 8,875,358 B2 * | 11/2014 | Ferguson | F16B 45/02 24/599.6 |
| 9,475,551 B1 | 10/2016 | Stoyanov | |
| 2005/0193531 A1 * | 9/2005 | Chang | F16B 45/02 24/600.2 |
| 2013/0219673 A1 * | 8/2013 | Perner | F16B 45/02 24/375 |

* cited by examiner

*Primary Examiner* — Robert Sandy
*Assistant Examiner* — David M Upchurch
(74) *Attorney, Agent, or Firm* — Naval Information Warfare Center Pacific; Kyle Eppele; J. Eric Anderson

(57) ABSTRACT

A snap-hook, including a hook and a dual-direction latch pivotally attached to the hook by a latch pin. The dual-direction latch blocks an opening to the hook's throat when held in a neutral position by a latch spring having a first spring force and a lever-return spring having a second spring force. The dual-direction latch is configured to move into the throat by overcoming the first spring force and to move out of the throat by overcoming the second spring force. The dual-direction latch comprises a spring guard attached to the dual-direction latch so as to shield the lever-return spring from coming into contact with one or both of an object disposed within a throat of the hook and an inner edge of the hook throat.

16 Claims, 7 Drawing Sheets

REINFORCED SNAP-HOOK WITH DUAL-DIRECTION SPRING LATCH

FEDERALLY-SPONSORED RESEARCH AND DEVELOPMENT

The United States Government has ownership rights in this invention. Licensing and technical inquiries may be directed to the Office of Research and Technical Applications, Space and Naval Warfare Systems Center, Pacific, Code 72120, San Diego, Calif., 92152; voice (619) 553-5118; ssc_pac_t2@navy.mil. Reference Navy Case Number 104028.

BACKGROUND OF THE INVENTION

The invention claimed herein applies to a device that can attach to and release an object. There are many scenarios where attaching and subsequently releasing a hook to/from an object can be challenging. For example, the current means of launching or recovering an unmanned underwater vehicle (UUV) over the side of a vessel's deck into the water often requires a user to lean over the side of the vessel while hanging onto the vessel and either manually hooking or manually releasing the UUV. This is dangerous for the user and the UUV and can be further complicated by rough seas as both the vessel and UUV are moving.

SUMMARY

Disclosed herein is a snap-hook, an embodiment thereof comprising, consisting of, or consisting essentially of a hook and a dual-direction latch. The hook has a throat and the dual-direction latch is pivotally attached to the hook by a latch pin. The dual-direction latch blocks an opening to the throat when held in a neutral position by internal springs. The dual-direction latch is configured to move into the throat by overcoming a first spring force and further configured to move out of the throat by overcoming a second spring force. The dual-direction latch comprises a spring guard disposed to shield at least one of the internal springs from coming into contact with one or both of an object disposed within a throat of the hook and an inner edge of the hook throat.

Another embodiment of the snap-hook may be described as comprising, consisting of, or consisting essentially of a hook, a lever, a bridge, a lever-return spring, a latch spring, and a spring guard. The hook includes a latch stop. The lever is pivotally attached to the hook by a latch pin. The bridge is pivotally attached to the hook by the latch pin. The lever-return spring is disposed between the lever and the bridge so as to bias the lever and the bridge against each other. The latch spring is disposed between the bridge and the hook so as to bias the bridge against the latch stop. The spring guard is attached to the lever and positioned so as to shield the lever-return spring from coming into contact with one or both of an object disposed within a throat of the hook and the latch stop. The lever is capable of being positioned in a neutral position where the lever is biased against the bridge, which is biased against the latch stop such that the lever blocks the throat opening of the hook. The lever is also capable of being positioned in a release position when exposed to a force greater than the spring force of the lever return spring such that the lever is pivoted away from the throat of the hook where the lever is no longer biased against the bridge, which is biased against the latch stop. The lever is also capable of being positioned in an open position when exposed to a force greater than the spring force of the latch spring such that the lever is pivoted into the throat of the hook where the lever is biased against the bridge, which is no longer biased against the latch stop.

Another embodiment of the snap-hook may be described as comprising, consisting of, or consisting essentially of a hook having a throat and a dual-direction latch. In this embodiment, the dual-direction latch blocks an opening to the throat when held in a neutral position by a lever-return spring and a latch spring. The dual-direction latch is configured to move into the throat by overcoming the spring force of the latch spring and further configured to move out of the throat by overcoming the spring force of the lever-return spring which is greater than the spring force of the latch spring. The dual-direction latch comprises a spring guard disposed to shield the lever-return spring from coming into contact with one or both of an object disposed within a throat of the hook and an inner edge of the hook throat.

BRIEF DESCRIPTION OF THE DRAWINGS

Throughout the several views, like elements are referenced using like references. The elements in the figures are not drawn to scale and some dimensions are exaggerated for clarity.

DETAILED DESCRIPTION OF EMBODIMENTS

The disclosed apparatus below may be described generally, as well as in terms of specific examples and/or specific embodiments. For instances where references are made to detailed examples and/or embodiments, it should be appreciated that any of the underlying principles described are not to be limited to a single embodiment, but may be expanded for use with any of the other methods and systems described herein as will be understood by one of ordinary skill in the art unless otherwise stated specifically.

Figure 1:
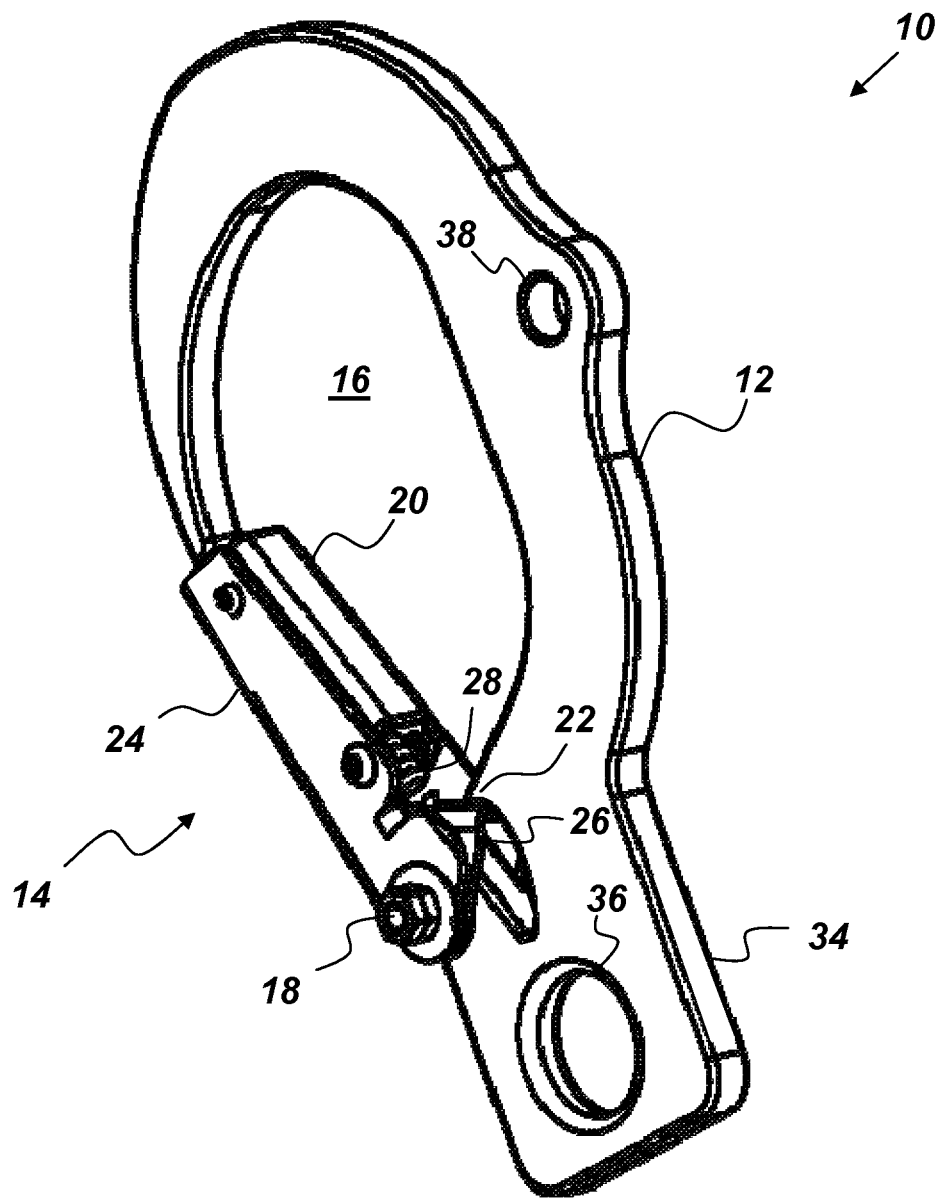
FIG. 1 is perspective view of an embodiment of a snap-hook.
Figure 2:
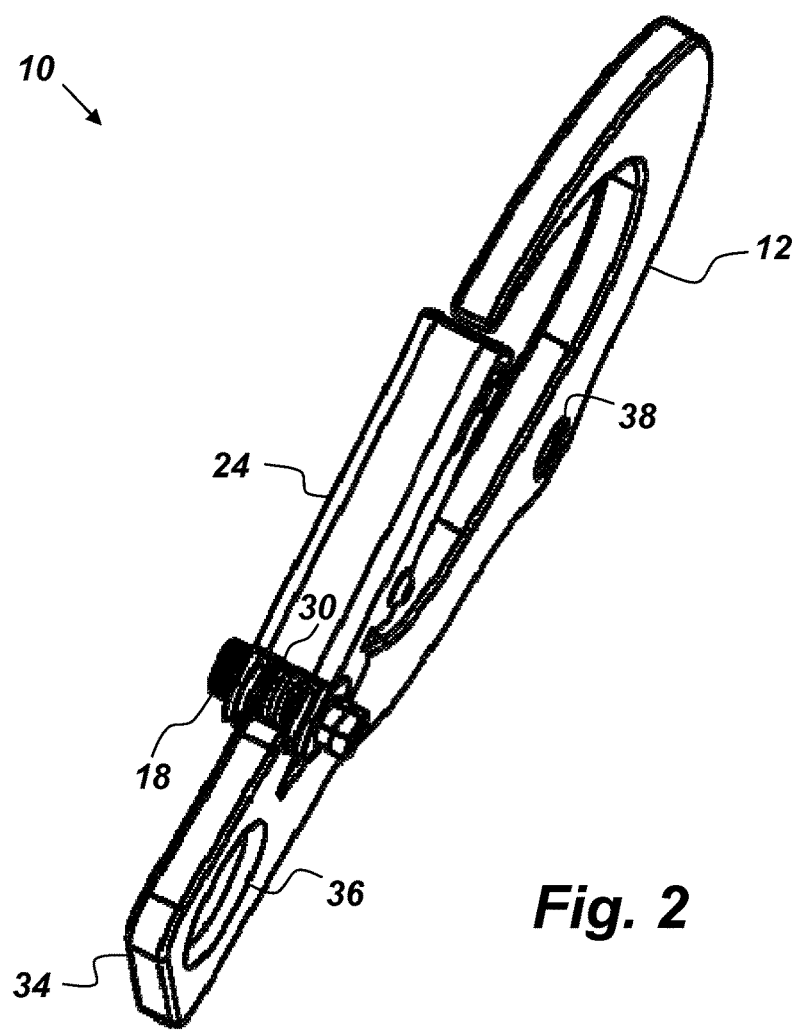
FIG. 2 is a perspective view of an embodiment of a snap-hook.

FIGS. 1 and 2 are perspective-view illustrations of an embodiment of a snap-hook 10 that comprises, consists of, or consists essentially of a hook 12 and a dual-direction latch 14. The hook 12 has a throat 16 and the dual-direction latch 14 is pivotally attached to the hook 12 by a latch pin 18. The dual-direction latch 14 blocks an opening to the throat 16 when held in a neutral position by internal springs. FIG. 1 shows the dual-direction latch 14 in the neutral position. The dual-direction latch 14 is configured to move into the throat 16 by overcoming a first spring force and further configured to move out of the throat 16 by overcoming a second spring force. The dual-direction latch 14 comprises a spring guard 20 disposed to shield at least one of the internal springs from coming into contact with one or both of an object disposed within a throat 16 of the hook 12 and a latch stop 22, which may be built into the hook 12, such as is shown in FIGS. 1 and 2.

In the embodiment of the snap-hook 10 shown in FIGS. 1 and 2, the dual-direction latch 14 comprises, in addition to the spring guard 20, a lever 24, a bridge 26, a lever-return spring 28, and a latch spring 30. The lever 24 is pivotally attached to the hook 12 by the latch pin 18. The bridge 26 is also pivotally attached to the hook 12 by the latch pin 18. The lever-return spring 28 is disposed between the lever 24 and the bridge 26 so as to bias the lever 24 and the bridge 26 against each other. In the embodiment of the snap-hook 10 shown in FIG. 1, the lever-return spring 28 is a helical tension spring, but it is to be understood that the lever-return spring 28 is not limited to tension springs. The lever-return spring 28 may be any spring capable of biasing the lever 24 against the bridge 26. The latch spring 30 is disposed between the bridge 26 and the hook 12 so as to bias the bridge 26 against the latch stop 22. The latch spring 30 shown in FIG. 2 is a helical torsion spring, but it is to be understood that the latch spring 30 is not limited to torsion springs. The latch spring 30 may be any spring capable of biasing the bridge 26 against the latch stop 22. The spring guard 20 is attached to the lever 24 and positioned so as to shield the lever-return spring 28 from coming into contact with one or both of an object 32 (such as is shown in FIGS. 3A-3C) disposed within a throat 16 of the hook 12 and the latch stop 22.

Figure 3A:
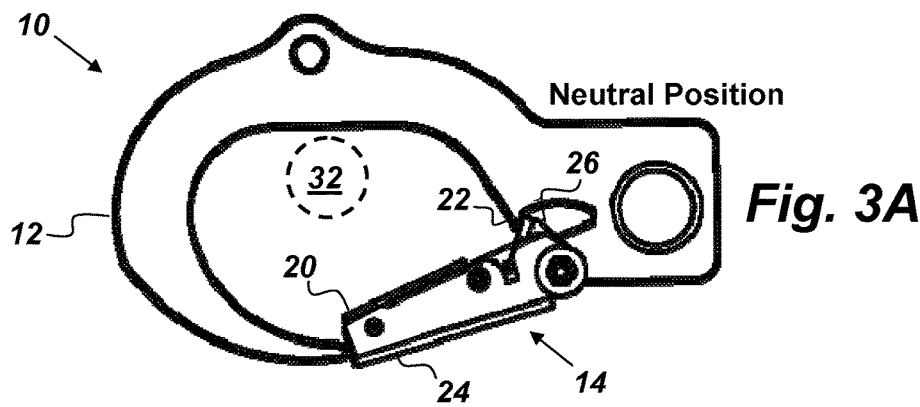
FIGS. 3A, 3B, and 3C are side views of an embodiment of a snap-hook in different positions.
Figure 3B:
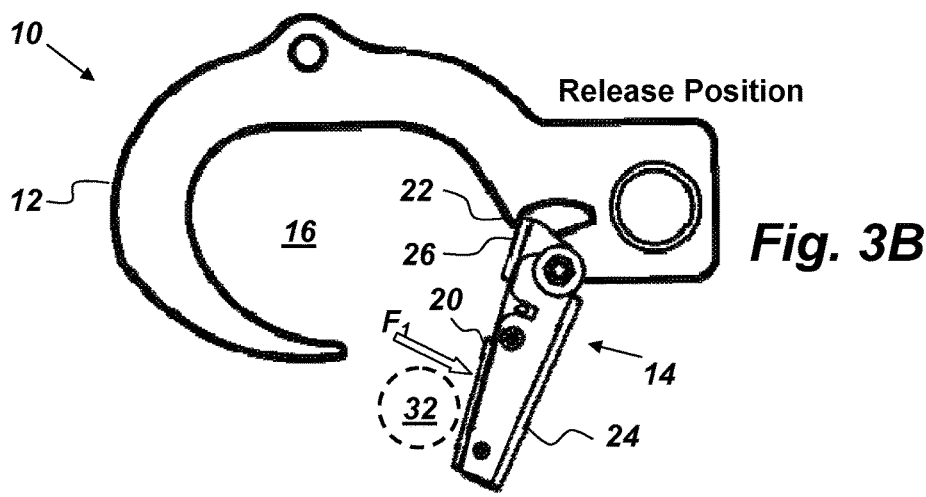
Figure 3C:
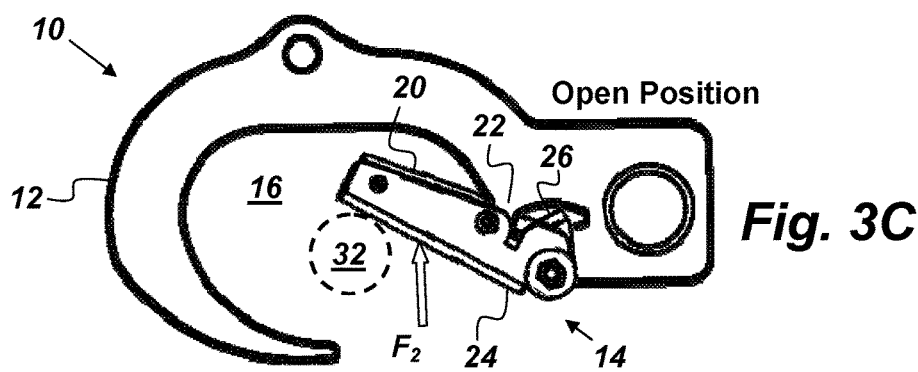

FIGS. 3A, 3B, and 3C are illustrations of the embodiment of the snap-hook 10 of FIGS. 1 and 2 in neutral, release, and open positions respectively. As shown in FIG. 3A, the dual-direction latch 14 is capable of being positioned in a neutral position where the lever 24 is biased against the bridge 26, which is biased against the latch stop 22 such that the lever 24 blocks the throat opening of the hook 12. The latch spring 30 biases the bridge 26 against the latch stop 22 thereby preventing the lever 24 from pivoting towards the throat 16 unless or until the latch 14 is acted upon by a force $F_2$ that is greater than the spring force of the latch spring 30. The lever-return spring 28 biases the lever 24 against the bridge 26 thereby helping to maintain the latch 14 in the neutral position and preventing the latch 14 from pivoting away from the throat 16 unless or until the latch 14 is acted upon by a force $F_1$ that is greater than the spring force of the lever return spring 28, thereby reducing the risk of unintentional releasing of an object 32 within the throat 16 of the snap-hook 10.

As shown in FIG. 3B, the dual-direction latch 14 is also capable of being positioned in a release position when exposed to the force $F_1$ that is greater than the spring force of the lever return spring 28 such that the lever 24 is pivoted away from the throat 16 of the hook 12. In the release position, the spring force of the lever-return spring 28 is overcome such that the lever 24 is pivoted away from the throat 16 and no longer biased against the bridge 26. However, in the release position, the bridge 26 is still biased against the latch stop 22 by the latch spring 30. When the dual-direction latch 14 is in the release position, the object 32 within the throat 16 is free to exit the hook 12. The object 32 may be any physical feature that a user desires to hook. For example, the object 32 may be, but is not limited to, a railing, a lifting bail, a mooring buoy, a ring, a harness, a rope, etcetera.

As shown in FIG. 3C, the dual-direction latch 14 is also capable of being positioned in an open position where the snap-hook 10 is open to receive the object 32. The latch 14 may be moved into the open position when exposed to the force $F_2$ that is greater than the spring force of the latch spring 30 such that the lever 24 is pivoted into the throat 16 of the hook 12. When the dual-direction latch 14 is in the open position the spring force of the latch spring 30 is overcome thereby allowing the bridge 26 to pivot away from the latch stop 22. In the open position, the lever 24 is still biased against the bridge 26 by the lever-return spring 28. When the spring force of the lever-return spring 28 is greater than the spring force of the latch spring 30 it follows that a smaller force is required to move the latch 14 into the open position than is required to move the latch 14 into the release position. The snap-hook 10 may be designed with various different springs having different spring forces as desired. For example, in one embodiment of the snap-hook 10, the spring force of the lever-return spring 28 is more than twice the spring force of the latch spring 30 such that it is considerably easier to connect the snap-hook 10 onto the object 32 than it is to remove it. Note that with respect to the embodiment of the snap-hook 10 shown in FIG. 3C, when the snap-hook 10 is in the fully open position the spring guard 20 comes in contact with the latch stop 22, which in this embodiment is formed out of an inner edge of the hook 12, thereby limiting further rotation into the throat 16 and protecting the lever-return spring 28.

The hook 12 may be made of any desired material. Suitable materials of which the hook 12 may be made include, but are not limited to, aluminum, titanium, 15-5 stainless steel, 17-4 stainless steel, carbon fiber, and carbon steel. As shown in FIGS. 1 and 2, the hook 12 has a shank end 34, a primary aperture 36, and secondary aperture 38. The primary aperture 36 is located at the shank end 34 and is suitable for attaching a primary line (such as primary line 48 depicted in FIG. 5). The secondary aperture 38 is located approximately opposite the opening of the throat 16 and is suitable for attaching a secondary line (such as secondary line 50 depicted in FIG. 5).

Figure 4:
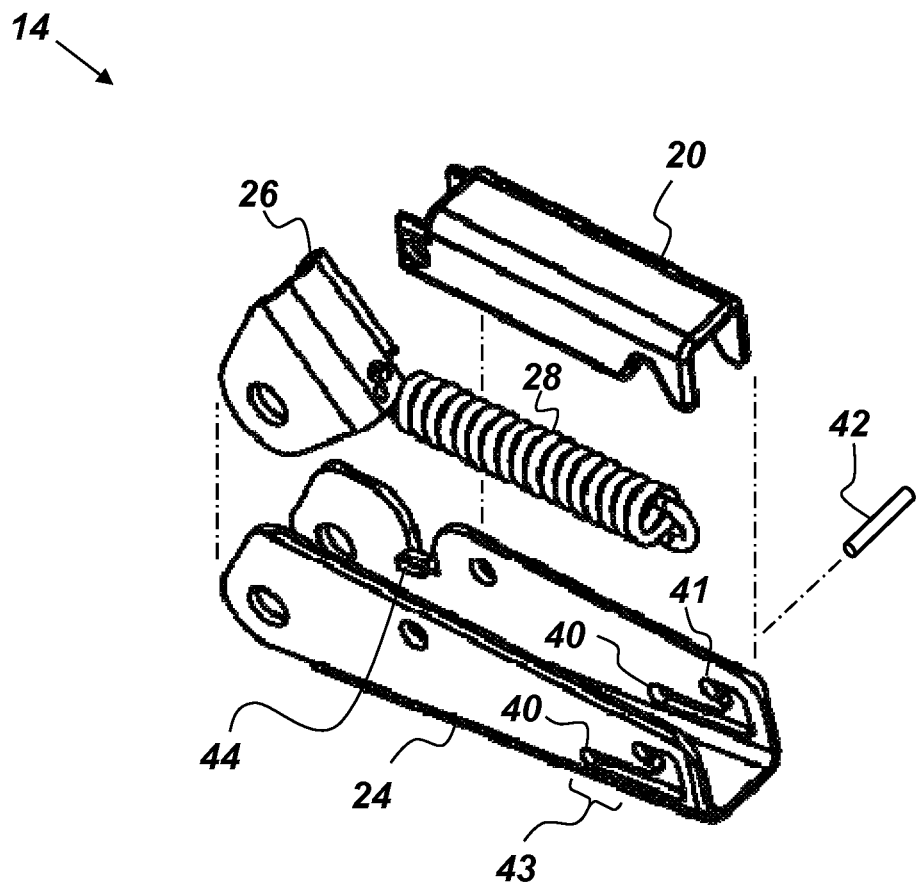
FIG. 4 is a perspective, exploded view of an embodiment of a dual-direction latch.

FIG. 4 is an exploded view of an example embodiment the latch 14 showing how the lever 24 in this embodiment has a U-shaped cross-section made out of folded stainless steel sheet metal within which the lever-return spring 28 is disposed. Also in this embodiment, the spring guard 20 is also made of folded stainless steel sheet metal having a U-shaped cross-section and fits within the lever 24 so as to form a four-sided channel that surrounds the lever-return spring 28. It is to be understood that the lever 24 and the spring guard 20 are not limited to structures having U-shaped cross-sections, but may be any structure capable of protecting the lever-return spring 28 from damage resulting from contact with the latch stop 22 or the object 32. In another embodiment of the latch 14, the spring guard 20 and the lever 24 may be formed out of a single piece of metal tubing. In the embodiment of the latch 14 shown in FIG. 4, the lever 24 further comprises two hook-shaped slots 40 and the lever-return spring 28 is mounted to an anchor pin 42 disposed within the two hook-shaped slots 40. Each hook-shaped slot comprises a slot tip end 41 and a slot shank end 43.

Figure 5:
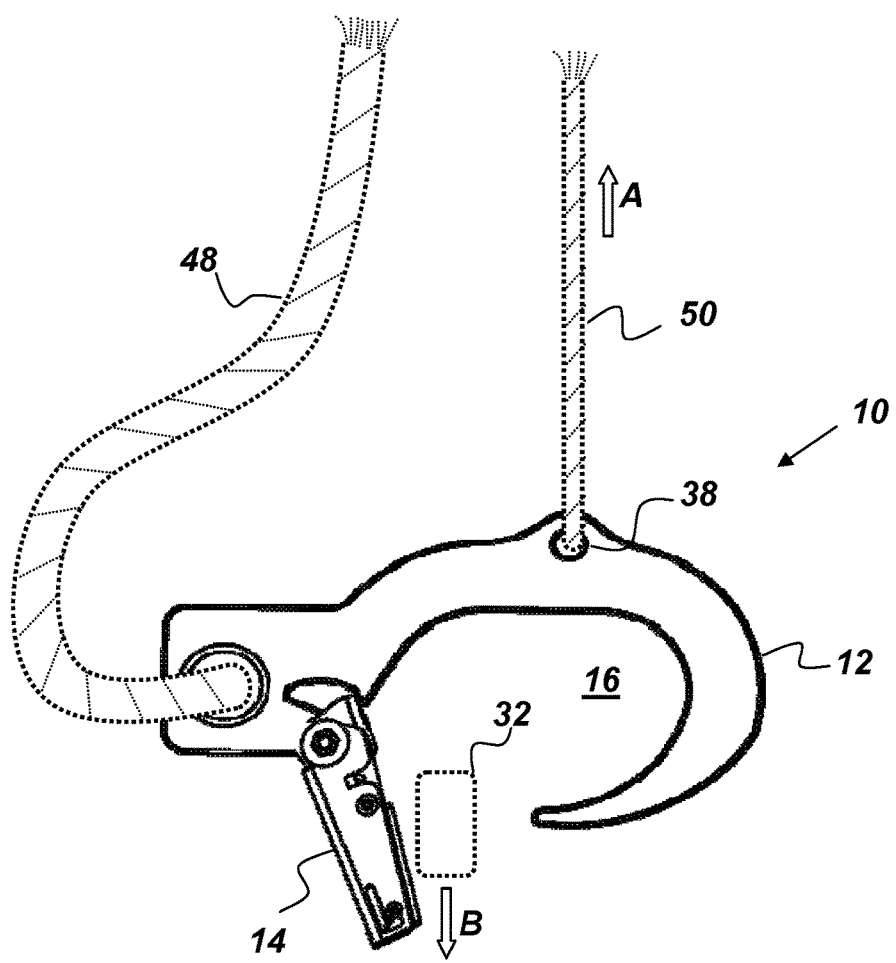
FIG. 5 is a side view of an embodiment of a snap-hook.
Figure 6:
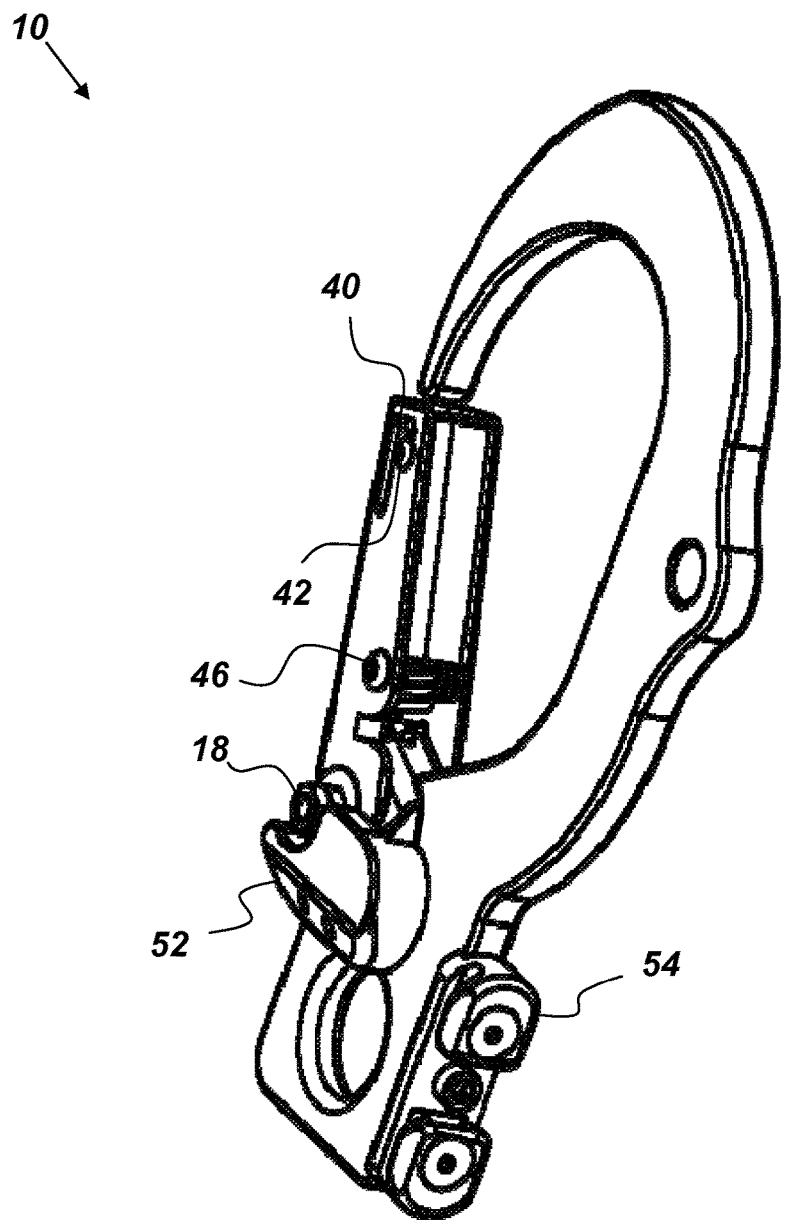
FIG. 6 is a perspective view of an embodiment of a snap-hook.

When the anchor pin 40 is in the slot tip end 41 (as is shown in FIGS. 5, 6, and 7A-7B) the lever-return spring 28 biases the anchor pin 40 against the slot tip end 41 and the lever 24 against the bridge 26. When the anchor pin 40 is in the slot shank end 43 the lever-return spring 28 is not under tension. The hook-shaped slots 40 facilitate the assembly of the snap-hook 10. In the embodiment of the latch 14 shown in FIG. 4, part of a side of the lever 24 is bent inward to create a lever stop 44 designed to provide an end stop to pivotal movement in one direction of the bridge 26 with respect to the lever 24. It is to be understood that the lever stop 44 is not limited to the embodiment shown in FIG. 4 but that the lever stop 44 may be any feature on the bridge 26 or the lever 24 or a separate feature that allows the bridge 26 to be biased against the lever 24. The spring guard 20 may be attached to the lever 24 via the anchor pin 42 and/or with fasteners 46, such as are depicted in FIG. 6. Alternatively, the spring guard 20 may be attached to the lever 24 in any suitable way such as by welding, adhesives, or by being formed out of the same material as the lever 24.

FIG. 5 is a side-view illustration of an embodiment of the snap-hook 10 where the snap-hook 10 is shown connected to a primary line 48 and a secondary line 50. In this embodiment, the secondary aperture 38 is positioned on the hook 12 such that when the primary and secondary lines 48 and 50 are attached to the snap-hook 10 and when there is slack in the primary line 48, a pulling force A applied to the secondary line 50 will cause the object 32 disposed within the throat 16 to contact the dual-direction latch 14. The object 32, for example, may be a mooring ring or a lifting bail of an unmanned underwater vehicle (UUV). If the pulling force A is greater than the spring force of the lever-return spring 28 then the object 32 will push the latch 14 into the release position allowing the object 32 to escape the throat 16 of the snap-hook 10 (provided the weight of the object 32, or other opposing force acting on the object 32, (represented by arrow B) is also greater than the spring force of the lever-return spring 28).

FIG. 6 is a perspective-view illustration of an embodiment of the snap-hook 10 further comprising a latch pin guard 52 mounted to the hook 12. The latch pin guard 52 provides a raised ridge that partially surrounds the latch pin 18. The latch pin guard 52 serves to protect the latch pin 18 from damage and can be helpful in preventing items (lines, ropes, seaweed, etc.) from catching onto the hook 12 when in use. In the embodiment of the latch pin guard 52 shown in FIG. 6, one side of the latch pin guard 52 is beveled on a side of the ridge opposite the latch pin 18. The embodiment of the snap-hook 10 depicted in FIG. 6 also comprises a rod adapter track 54 attached to the shank 34 of the hook 12. The rod adapter track 54 is shaped to enable the rod adapter track 54 to slidingly mate with an end 56 of a hand-held rod 58 by slipping on and off the rod end 56.

Figure 7A:
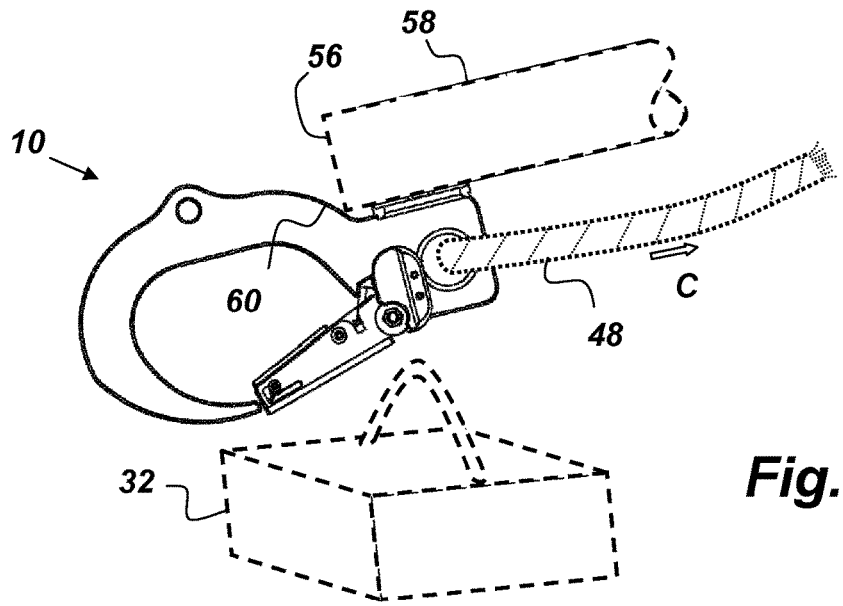
FIGS. 7A and 7B are side views of an embodiment of a snap-hook.
Figure 7B:
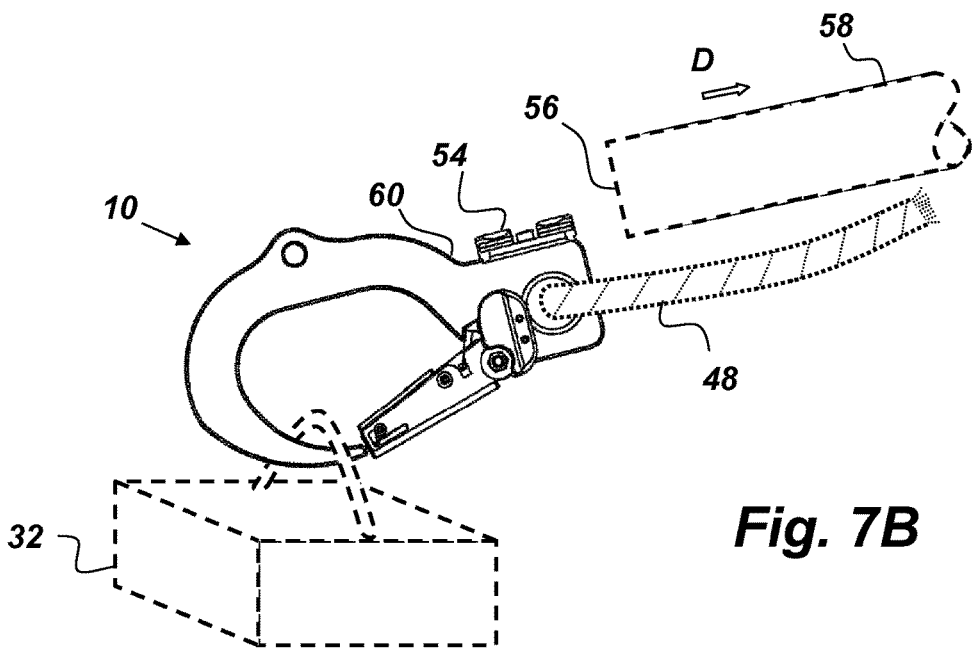

FIGS. 7A and 7B are side-view illustrations of the snap-hook 10 showing a potential interaction with the hand-held rod 58. The rod adapter track 54 is shaped to enable it to slip or slide on and off of the rod end 56. In this embodiment of the snap-hook 10 (i.e., the embodiment shown in FIGS. 7A-7B), the hook 12 further comprises a shoulder 46 adjoined to the shank end 34 such that the rod 58, when fully mated to the rod adapter track 54 (such as is shown in FIG. 7A), contacts, and is prevented from further movement toward the throat 16 by, the shoulder 60. The rod 58 may be any rod of any length that is capable of being held and wielded by a person. The rod 58 may have any desired cross-sectional shape. For example, a suitable example of the rod 58 includes, but is not limited to, a ~2 meter, T-slotted aluminum pole. As shown, the rod end 56 is in contact with the shoulder 60.

The rod 58 may be prevented from sliding off the rod adapter track 54 by applying a pulling force C on the primary line 48. For example, a user holding the rod 58 and the primary line 48 may apply enough force on the primary line 48 to limit relative motion between the rod adapter track 54 and the rod 58. While not shown in FIG. 10, it is to be understood that the secondary line 50 may be used in addition to, or in lieu of, the primary line 48 for limiting the relative motion between the rod adapter track 54 and the rod 58. The rod 58 can be slid onto the rod adapter track 54 until the rod end 56 comes in contact with the shoulder 60. With the snap-hook 10 thus attached to the end of the rod 58, a user can hold the other end of the rod 58 and move the snap-hook 10 into a desired position where it can capture the object 32.

FIG. 7B shows the snap-hook 10 being detached from the rod 58. Once the object 32 has been captured by the snap-hook 10, the user may apply a pulling force D to the rod 58 to allow the rod adapter track 54 to slide out of the rod 58. The snap-hook 10 will remain connected to the object 32 and the primary line 48 may be used to lift the object 32 or to act as a mooring line.

For example, if the object 32 is an object that someone would like to recover from the water (such as a UUV after it has completed its mission), the snap-hook 10 may be affixed the end of the rod 58 to allow a person to reach out to the UUV, connect the snap-hook 10 to the lifting bail, remove the rod 58, and then lift the UUV out of the water all from a safe distance (e.g., as far away as one can effectively wield the rod 58). This is a safer procedure—for both personnel and the UUV—than positioning a boat within arms-reach of the UUV and having a person lean over the side of the boat and try to secure a hook to the UUV. An embodiment of the snap-hook 10 that weighs less than 300 grams was designed specifically for launching and recovering UUVs weighing up to 454 kilograms (1000 lbs.). The snap-hook 10 may also be used to place the UUV into the water in a safe manner.

Continuing with the example scenario where the object 32 is a UUV, the snap-hook 10 may also be used to aid in launching the UUV. First, the UUV may be lowered into the water via the primary line 48, which is attached to the snap-hook 10, which in turn is connected to the UUV's lifting bail. Once the UUV is in the water and the primary line 48 is made slack, the secondary line 50 may be pulled with sufficient force to cause the snap-hook 10 to reposition itself on the lifting bail such that the lifting bail pushes the dual-direction latch 14 open and releases the UUV. Mention has been made of using the snap-hook 10 in connection with launching and recovering UUVs, but it is to be understood that use of the snap-hook 10 is not limited to UUVs, but may be used in other applications where one desires a hook with a dual-direction latch.

From the above description of the snap-hook 10, it is manifest that various techniques may be used for implementing the concepts of the snap-hook 10 without departing from the scope of the claims. The described embodiments are to be considered in all respects as illustrative and not restrictive. The apparatus disclosed herein may be practiced in the absence of any element that is not specifically claimed and/or disclosed herein. It should also be understood that the snap-hook 10 is not limited to the particular embodiments described herein, but is capable of many embodiments without departing from the scope of the claims.

We claim:
1. A snap-hook, comprising:
a hook having a throat;
a dual-direction latch pivotally attached to the hook by a latch pin, wherein the dual-direction latch blocks an opening to the throat when held in a neutral position by a latch spring having a first spring force and a lever-return spring having a second spring force that is greater than the first spring force, and wherein the dual-direction latch is configured to move into the throat by overcoming the first spring force and further configured to move out of the throat by overcoming the second spring force;

wherein the dual-direction latch comprises a spring guard disposed to shield the lever-return spring from coming into contact with an inner edge of the hook throat; and wherein the dual-direction latch further comprises a lever that has a U-shaped cross-section having a base and two sides and the lever-return spring is disposed between the sides, and wherein the spring guard has a U-shaped cross-section and fits between the sides of the lever so as to form a four-sided channel that surrounds the lever-return spring.

2. The snap-hook of claim 1, wherein the lever further comprises two hook-shaped slots disposed in the sides at a distal end of the lever, and wherein an end of the lever-return spring is mounted to an anchor pin disposed within the two hook-shaped slots.

3. The snap-hook of claim 2, further comprising a latch pin guard mounted to the hook providing a raised ridge that partially surrounds the latch pin.

4. The snap-hook of claim 3, wherein the latch pin guard is beveled on a side of the ridge opposite the latch pin.

5. A snap-hook comprising:
a hook having a latch stop;
a lever pivotally attached to the hook by a latch pin;
a bridge pivotally attached to the hook by the latch pin;
a lever-return spring disposed between the lever and the bridge thereby biasing the lever and the bridge against each other;
a latch spring disposed between the bridge and the hook thereby biasing the bridge against the latch stop;
a spring guard attached to the lever and positioned so as to shield the lever-return spring from coming into contact with one or both of an object disposed within a throat of the hook and the latch stop;
wherein the lever is capable of being positioned in a neutral position where the lever is biased against the bridge, which is biased against the latch stop such that the lever blocks the throat opening of the hook;
wherein the lever is capable of being positioned in a release position when exposed to a force greater than the spring force of the lever return spring such that the lever is pivoted away from the throat of the hook where the lever is no longer biased against the bridge, which is biased against the latch stop;
wherein the lever is capable of being positioned in an open position when exposed to a force greater than the spring force of the latch spring such that the lever is pivoted into the throat of the hook where the lever is biased against the bridge, which is no longer biased against the latch stop; and
wherein the lever further comprises two hook-shaped slots disposed in opposite sides of the lever, wherein each hook-shaped slot comprises a tip section and a shank section.

6. The snap-hook of claim 5, wherein an end of the lever-return spring is mounted to an anchor pin disposed within the two hook-shaped slots such that when the anchor pin is in the tip section the lever-return spring biases the anchor pin against an end of the tip section and when the anchor pin is in the shank section the lever-return spring is not under tension.

7. The snap-hook of claim 6, wherein the spring guard is attached to the lever via the anchor pin.

8. The snap-hook of claim 7, further comprising a latch pin guard mounted to the hook and comprising a raised, protective ridge partially surrounding the latch pin.

9. The snap-hook of claim 8, wherein the hook further comprises a shank end, a primary aperture, and a secondary aperture, wherein the primary aperture is located at the shank end and is suitable for attaching a primary line and the secondary aperture is located approximately opposite the throat opening and is suitable for attaching a secondary line.

10. The snap-hook of claim 9, wherein the secondary aperture is located such that when the primary and secondary lines are attached and there is slack in the primary line, a pulling force applied to the secondary line will cause the object disposed within the throat of the hook to contact the dual-direction latch.

11. The snap-hook of claim 10, wherein the dual-direction latch is configured to be forced open by the object if the pulling force on the secondary line is sufficient to overcome the spring force of the lever-return spring thereby releasing the object from the snap-hook.

12. The snap-hook of claim 11, further comprising a rod adapter track attached to the shank end of the hook, wherein the rod adapter track is shaped to enable the rod adapter track to slidingly mate with an end of a hand-held rod by slipping on and off the rod end.

13. The snap-hook of claim 12, wherein the hook further comprises a shoulder adjoined to the shank end such that the rod, when fully mated to the rod adapter track, contacts, and is prevented from further movement toward the throat by, the shoulder.

14. A snap-hook, comprising:
a hook having a throat;
a dual-direction latch pivotally attached to the hook by a latch pin, wherein the dual-direction latch blocks an opening to the throat when held in a neutral position by a lever-return spring and a latch spring, and wherein the dual-direction latch is configured to move into the throat by overcoming the spring force of the latch spring and further configured to move out of the throat by overcoming the spring force of the lever-return spring which is greater than the spring force of the latch spring; and
wherein the dual-direction latch comprises a spring guard disposed to shield the lever-return spring from coming into contact with one or both of an object disposed within a throat of the hook and an inner edge of the hook throat; and
wherein the lever-return spring is attached to an anchor pin disposed in hook-shaped slots in the dual-direction latch, wherein each hook-shaped slot comprises a slot tip end and a slot shank end, such that when the anchor pin is in the slot tip ends the lever-return spring biases the anchor pin against an end of the slot tip ends and when the anchor pin is in the slot shank ends the lever-return spring is not under tension.

15. The snap-hook of claim 14, further comprising a latch pin guard mounted to the hook, wherein the latch pin guard comprises a raised, protective ridge partially surrounding the latch pin.

16. The snap-hook of claim 15, wherein the hook further comprises a shank end, a primary aperture, and a secondary aperture, wherein the primary aperture is located at the shank end and is suitable for attaching a primary line and the secondary aperture is located approximately opposite the throat opening and is suitable for attaching a secondary line such that when the primary and secondary lines are attached to their respective apertures and there is slack in the primary line, a pulling force applied to the secondary line will cause the object disposed within the throat of the hook to contact the dual-direction latch and force the dual-direction latch to pivot away from the throat if the pulling force is greater than the spring force of the lever-return spring.

* * * * *